Feb. 13, 1940.                M. WAGNER                      2,190,496
                    PERMANENT MOLDING APPARATUS
                      Filed Oct. 21, 1938           10 Sheets-Sheet 1
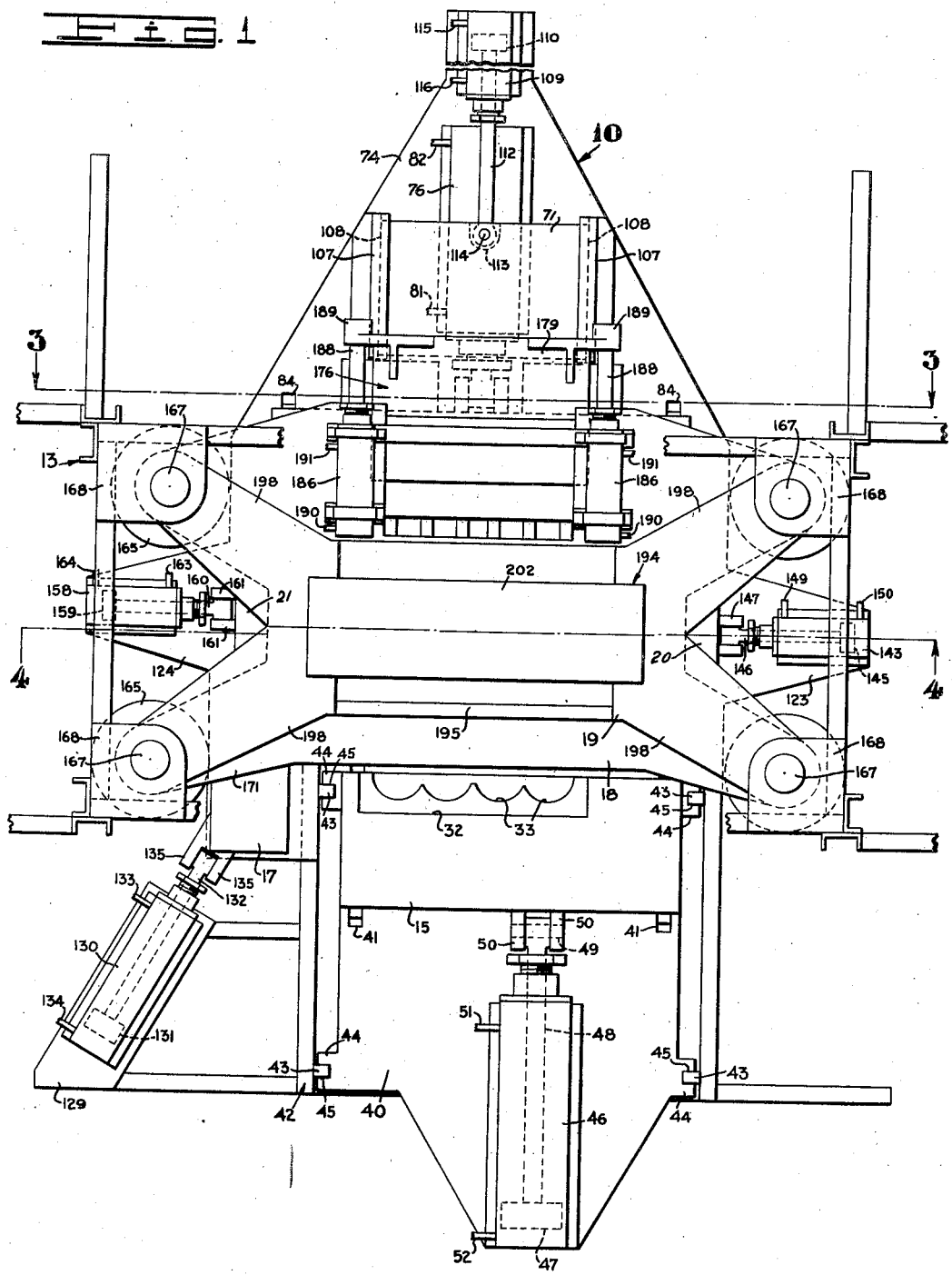
INVENTOR.
M. WAGNER.
BY
ATTORNEY.

Feb. 13, 1940.　　　　M. WAGNER　　　　2,190,496
PERMANENT MOLDING APPARATUS
Filed Oct. 21, 1938　　　10 Sheets-Sheet 2
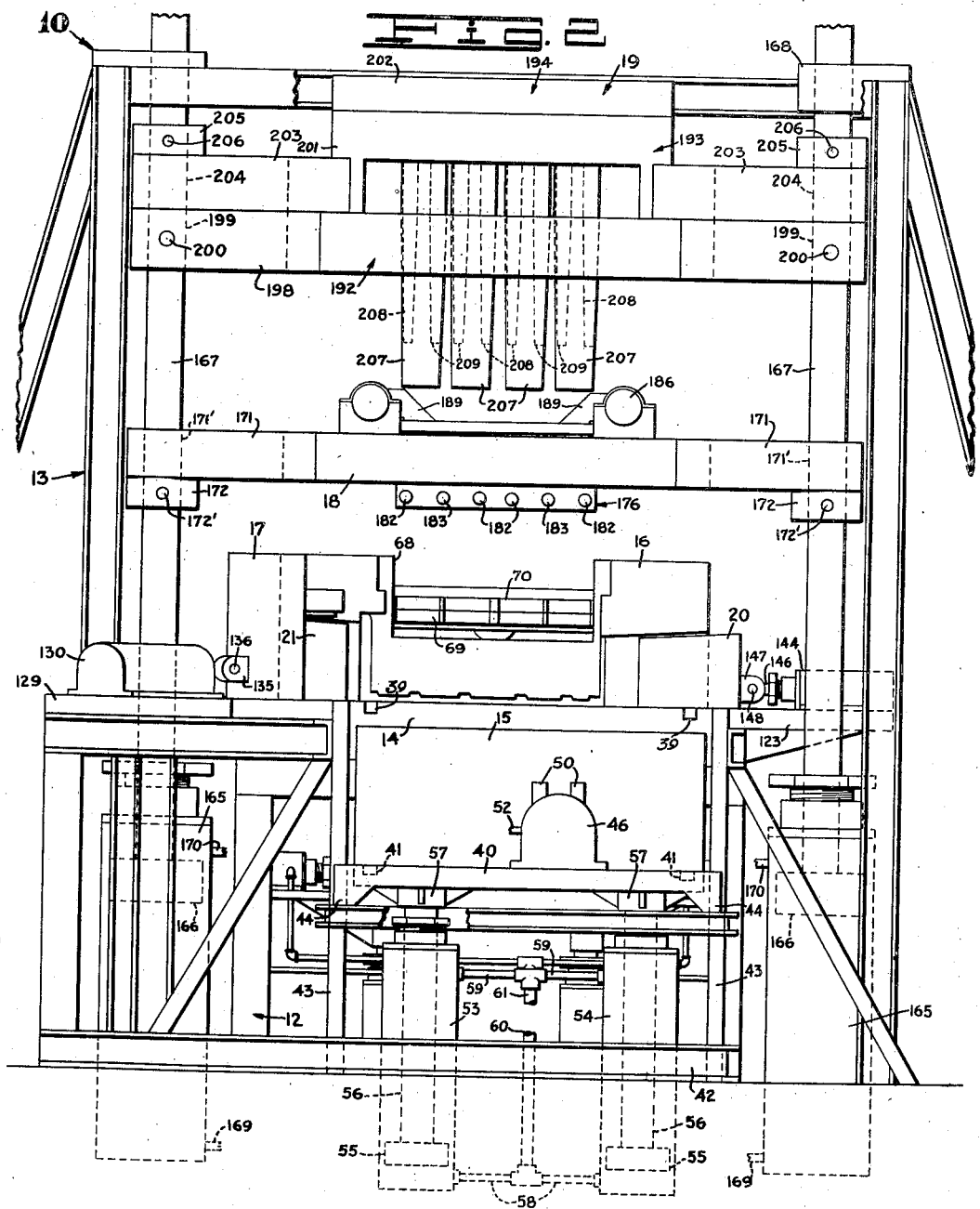

Feb. 13, 1940.  M. WAGNER  2,190,496
PERMANENT MOLDING APPARATUS
Filed Oct. 21, 1938  10 Sheets-Sheet 3
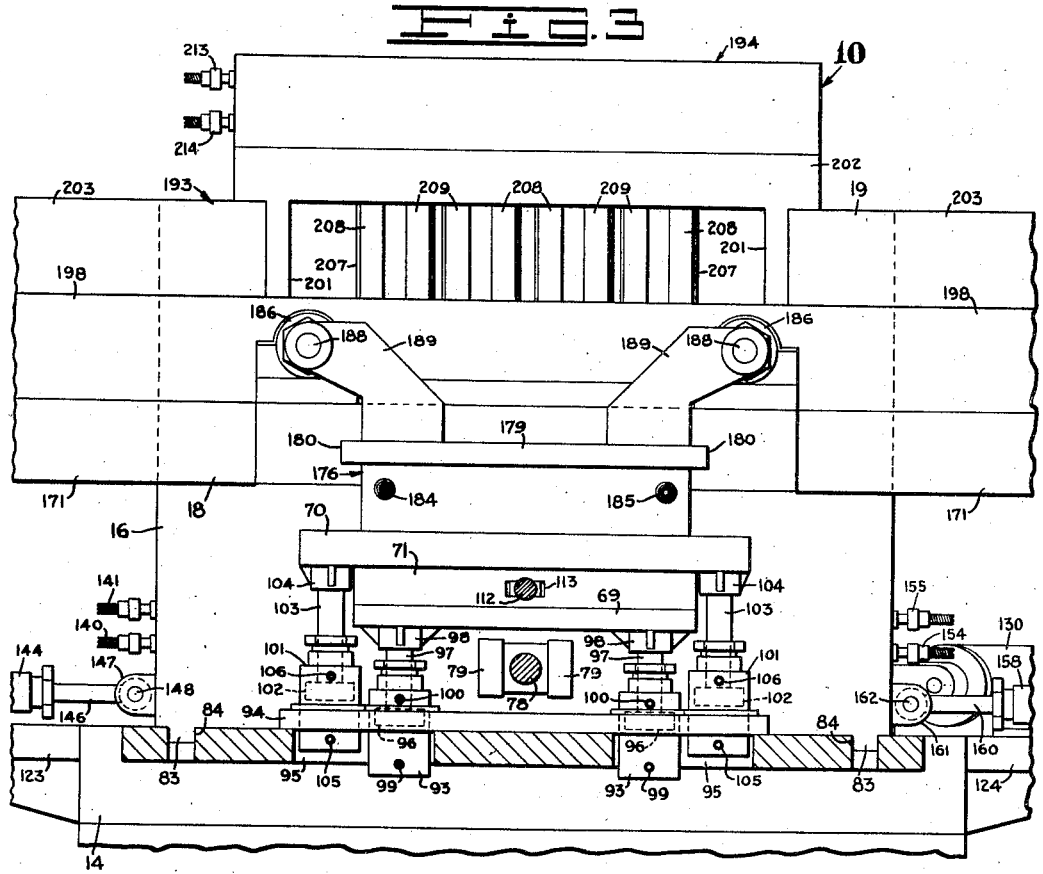
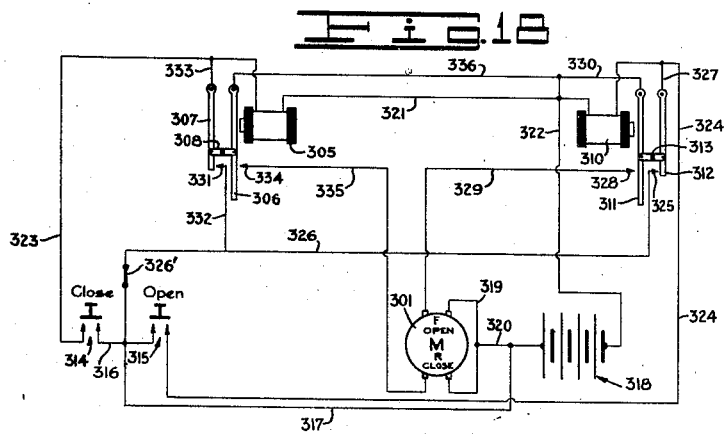
INVENTOR.
M. WAGNER.
BY
ATTORNEY.

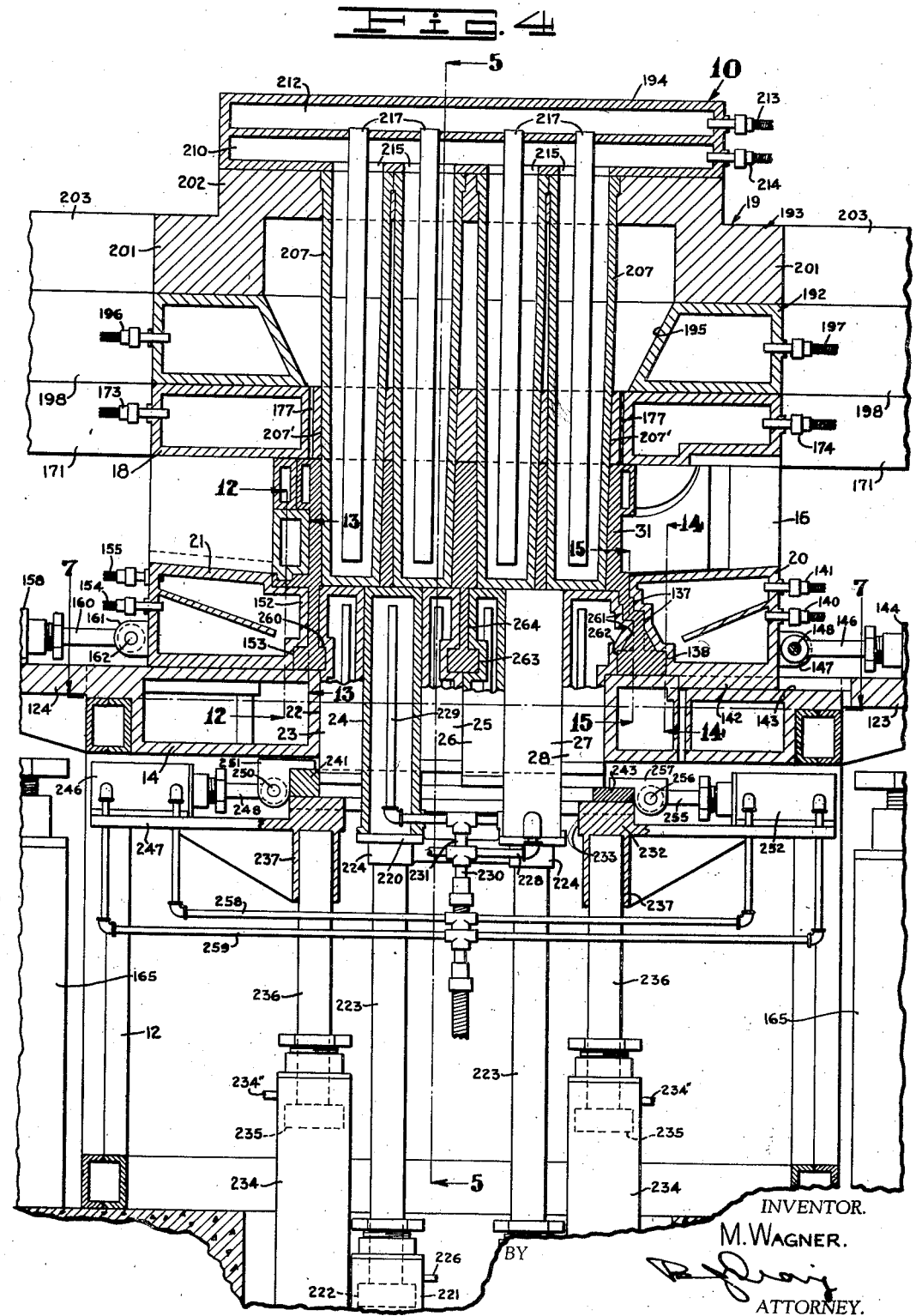

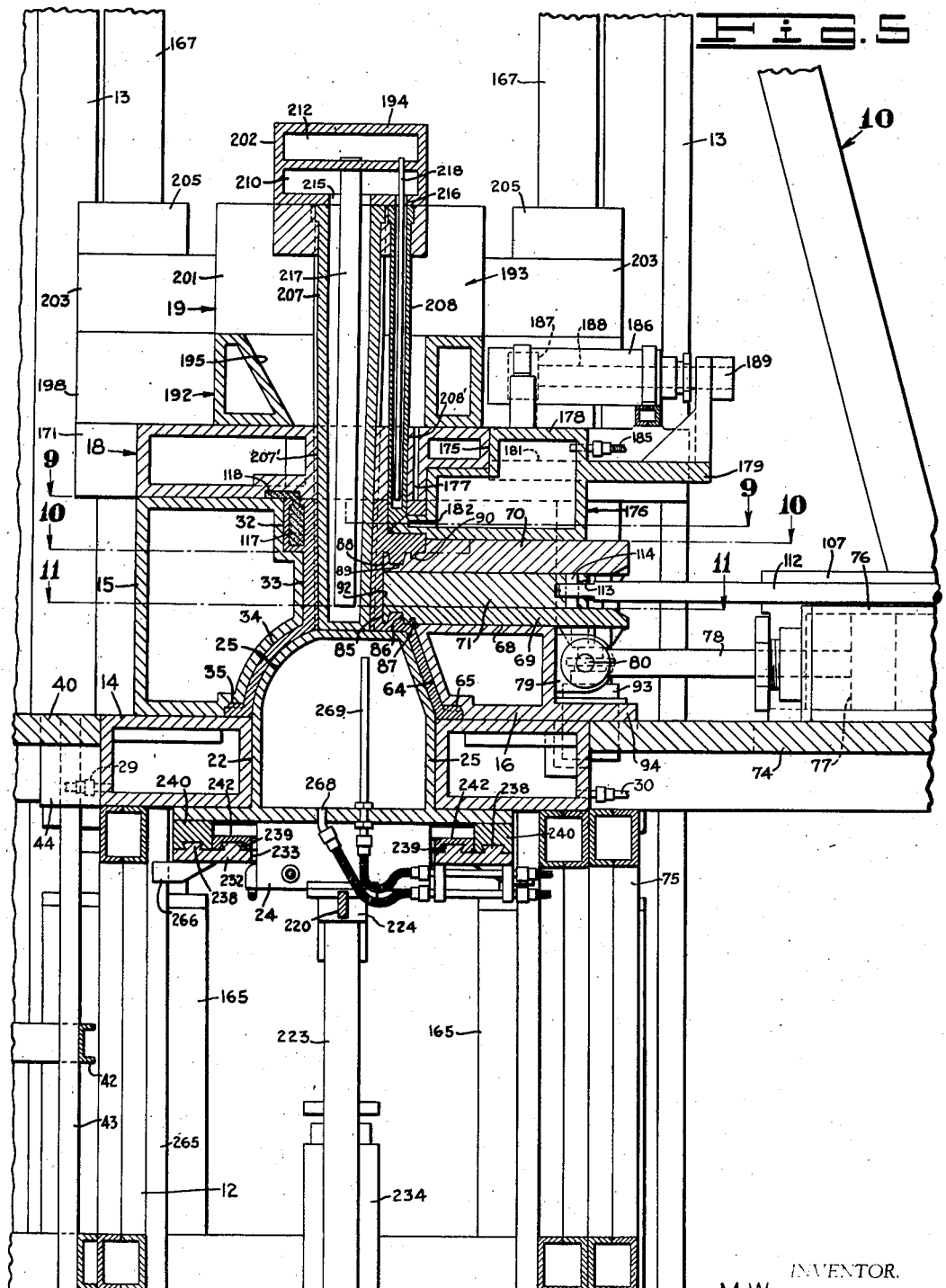

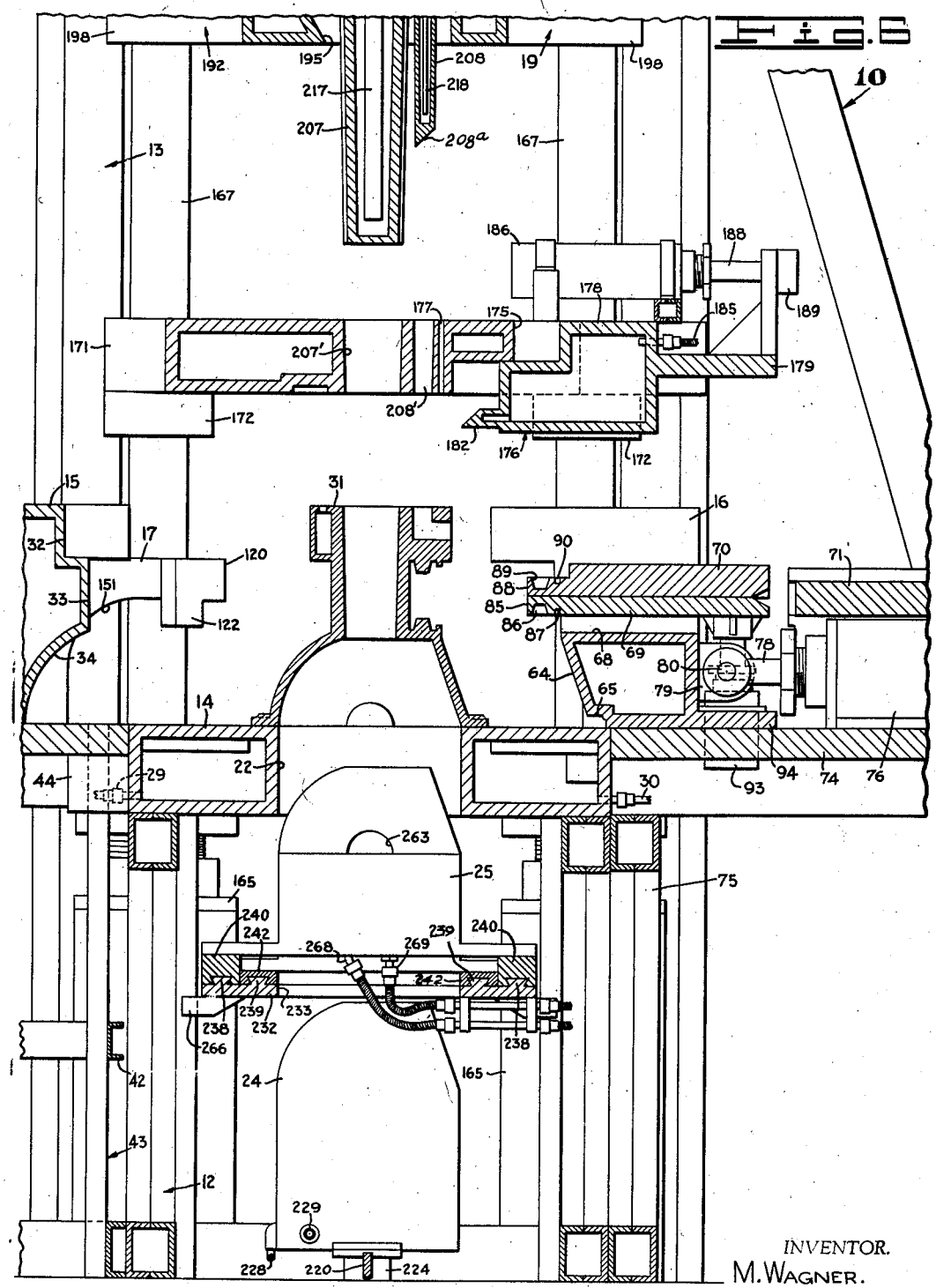

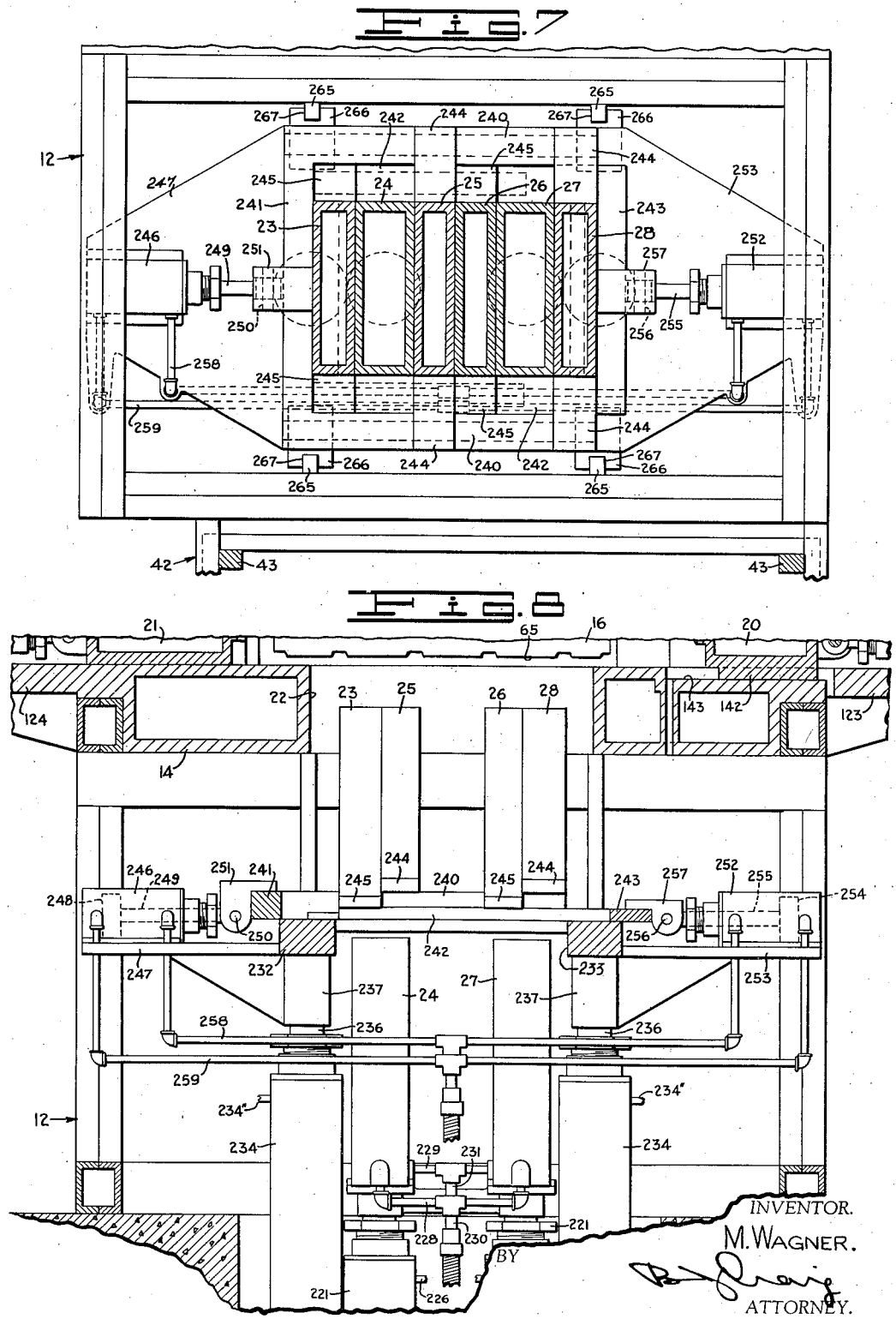

Feb. 13, 1940. M. WAGNER 2,190,496
PERMANENT MOLDING APPARATUS
Filed Oct. 21, 1938 10 Sheets-Sheet 8
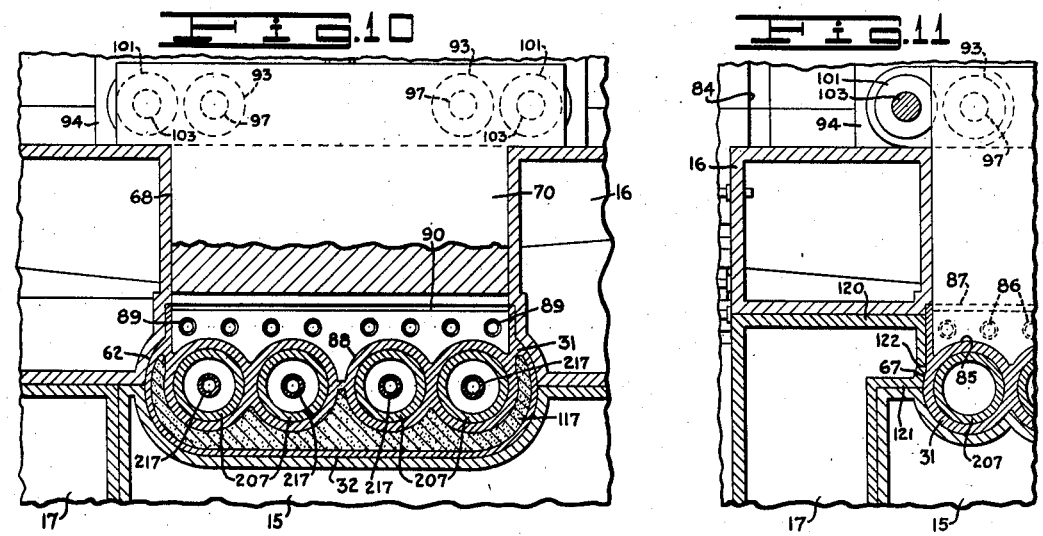
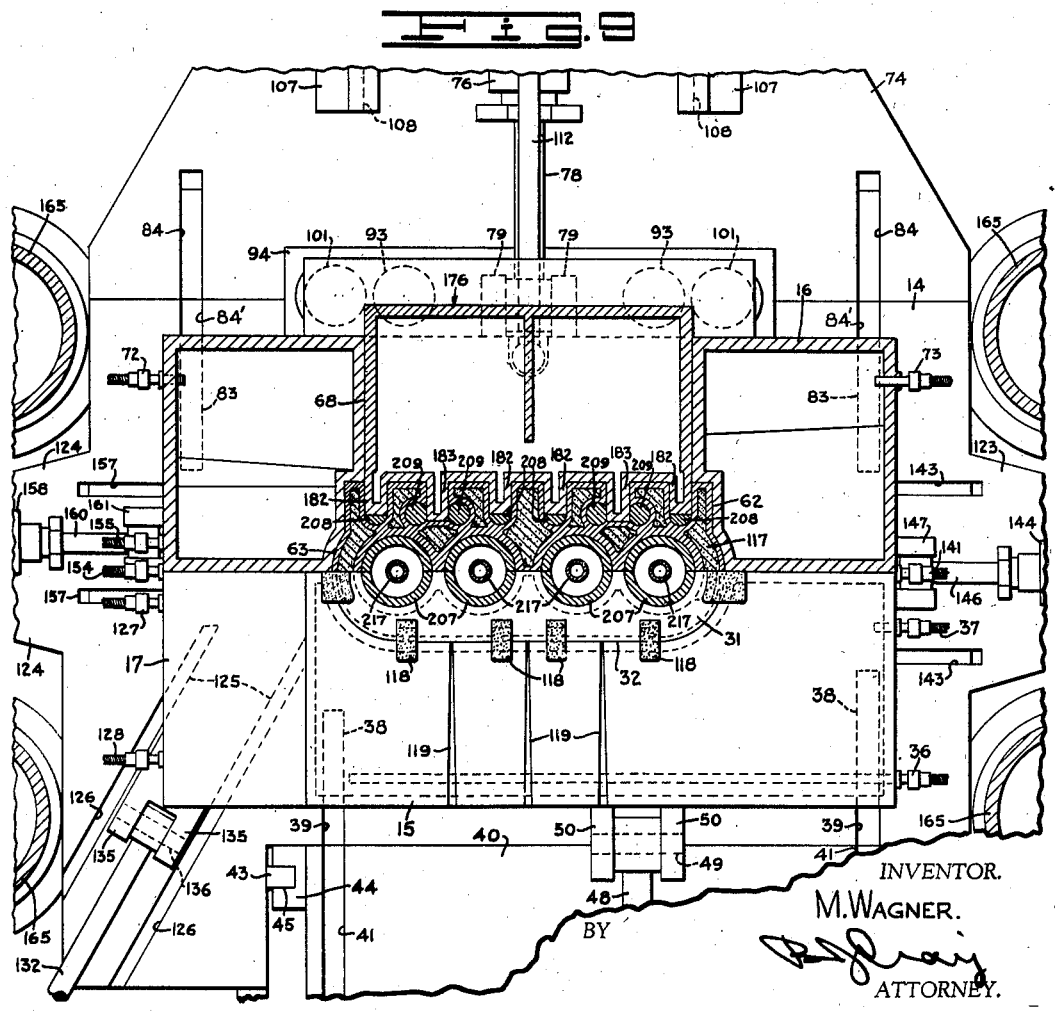
INVENTOR.
M. WAGNER.
BY
ATTORNEY.

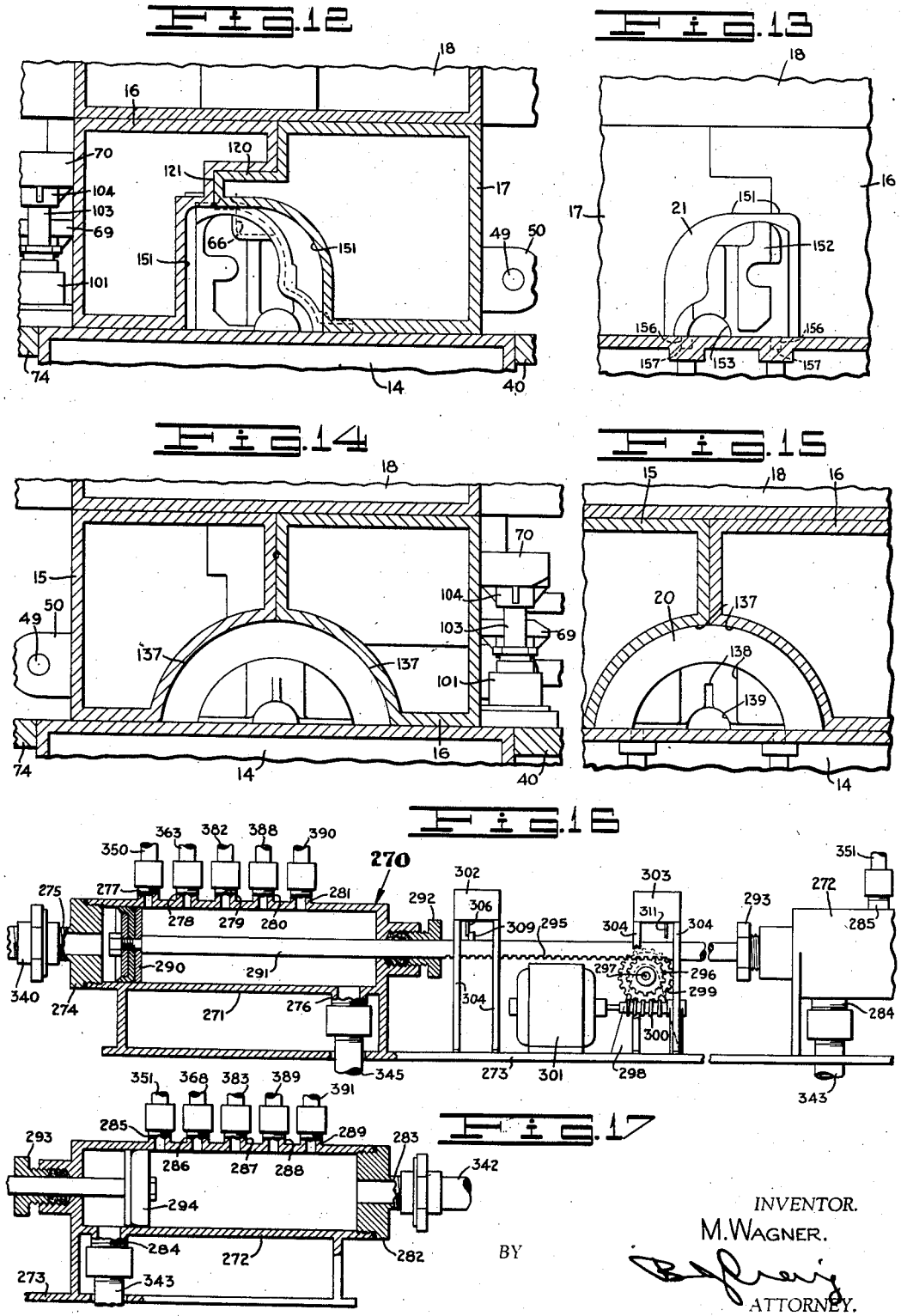

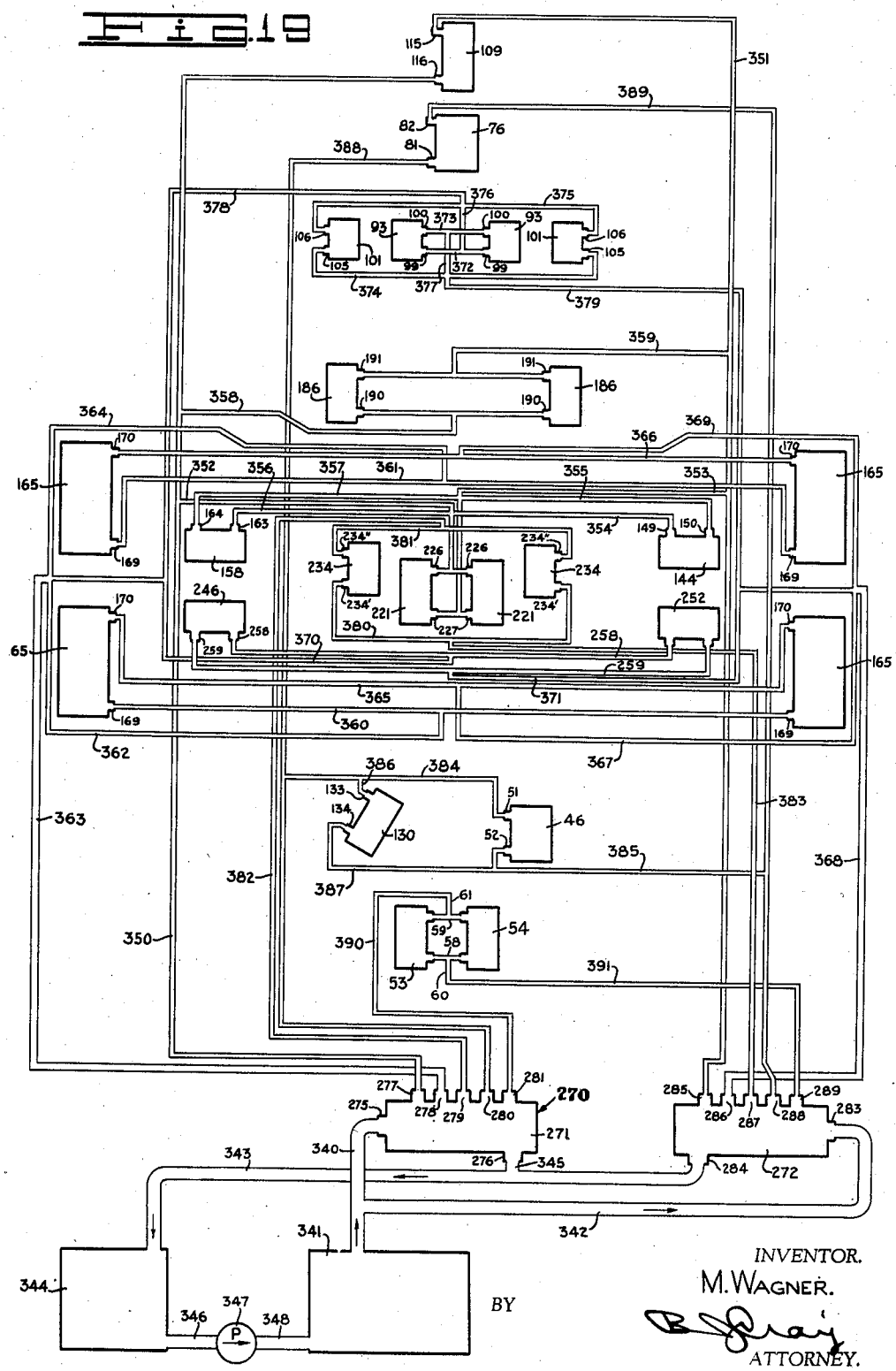

Patented Feb. 13, 1940

2,190,496

UNITED STATES PATENT OFFICE 2,190,496

PERMANENT MOLDING APPARATUS

Matthew Wagner, Glendale, Calif.

Application October 21, 1938, Serial No. 236,230

10 Claims. (Cl. 22—92)

This invention relates to improvements in mechanical molding devices.

The general object of the invention is to provide a mechanical mold device which is particularly adapted for use in the manufacture of engine blocks.

Another object of the invention is to provide a mechanical mold which includes novel means for separating the mold body.

A further object of the invention is to provide a mechanical mold which includes novel permanent core members and novel means for removing the core members.

Other objects and the advantages of this invention will be apparent from the following description taken in connection with the accompanying drawings, wherein:

Fig. 1 is a top plan view of my improved mechanical mold device showing it in an open position;

Fig. 2 is a front view of the mold device showing it in an open position;

Fig. 3 is a fragmentary enlarged section taken on line 3—3 of Fig. 1 showing the mold device in a closed position;

Fig. 4 is an enlarged fragmentary section taken on line 4—4 of Fig. 1;

Fig. 5 is a section taken on line 5—5 of Fig. 4;

Fig. 6 is a fragmentary view similar to Fig. 5 showing the mold in an open position;

Fig. 7 is a fragmentary section taken on line 7—7 of Fig. 4 with the mold base removed;

Fig. 8 is a fragmentary view similar to Fig. 4 showing the mold device open;

Fig. 9 is a section taken on line 9—9 of Fig. 5;

Fig. 10 is a fragmentary section taken on line 10—10 of Fig. 5;

Fig. 11 is a fragmentary section taken on line 11—11 of Fig. 5;

Fig. 12 is a fragmentary section taken on line 12—12 of Fig. 4 with the end core member removed;

Fig. 13 is a fragmentary section taken on line 13—13 of Fig. 4 with the engine block removed;

Fig. 14 is a fragmentary section taken on line 14—14 of Fig. 4 with the end core member removed;

Fig. 15 is a fragmentary section taken on line 15—15 of Fig. 4 with the engine block removed;

Fig. 16 is a fragmentary side elevation partly in section of the control device;

Fig. 17 is a longitudinal section through the control cylinder not sectioned in Fig. 16;

Fig. 18 is a diagram of the electrical apparatus and circuit of operating the control device; and Fig. 19 is a diagram showing the conduit connections between the control device and the various operating cylinders of the mold device.

Referring to the drawings by reference characters I have indicated my improved molding apparatus generally at 10. As shown the apparatus includes a lower frame 12 and an upwardly extending frame 13.

In general the mold proper includes a base member 14 which is supported on the lower frame 12, a pair of opposed horizontally movable mold body members 15 and 16 and an angularly movable member 17 which are supported on the mold base 14 only when the mold is closed. The mold proper further includes a vertically movable top member 18 and thereabove a vertically movable gate and core supporting member 19. Also mounted on the mold base 14 the apparatus includes a pair of longitudinally movable end core members 20 and 21.

The mold base 14 has a central aperture 22 therein in which are positioned a plurality of vertically movable crank case core members 23, 24, 25, 26, 27 and 28. The body of the mold base 14 surrounding the aperture 22 is formed hollow and has an inlet conduit 29 and an outlet conduit 30 communicating with the interior thereof for the purpose of circulating oil therethrough to maintain the base 14 at a predetermined temperature (see Figs. 5 and 6).

As previously stated, the apparatus 10 is designed to form the block portion of an internal combustion engine which I have indicated generally at 31. The general structure of internal combustion engines being so well known it therefore is thought unnecessary to specifically identify the various structural details of the engine block 31. The engine block 31 shown is preferably of the type used for a vertical four cylinder poppet valve type internal combustion engine although my apparatus may be used in manufacturing other engine blocks.

The body member 15 is adapted to form one half or the right half of the block 31 and the inner face thereof is shaped as at 32 to form the outer face of the water jacket and shaped as at 33 to form the outer surface of the cylinders. The body is also shaped as at 34 to form the outer surface of the crank case and as at 35 to form the crank case pan supporting flange. The body 15 like the base 14 is formed hollow and has an inlet conduit 36 and an outlet conduit 37 communicating with the interior thereof for the purpose of circulating temperature controlling oil therethrough. The body 15 adjacent each end includes a depending rail portion 38 which fits within a guide recess 39 in the base 14.

To receive the body member 15 when it is moved outwardly I provide a vertically movable table 40 the upper face of which when in a raised position is in the same plane as the upper face of the mold base 14. In the upper face thereof the table 40 has guide recesses 41 therein which align with the guide recesses 39 in the mold base 14 and are adapted to slidably receive the body rails 38.

The table 40 is mounted on a frame 42 which includes four vertical guide rails 43. The table 40 includes four protruding guide members 44 each of which has a notch 45 therein to receive one of the vertical guide rails 43. Mounted on the table 40 I provide a cylinder 46 having therein a piston 47 and extending therefrom a piston rod 48 (see Fig. 1). The piston rod 48 is secured as by a pin 49 between a pair of protruding bosses 50 on the body member 15. Adjacent the inner end thereof the cylinder 46 has a conduit 51 communicating with the interior thereof and adjacent the outer end a conduit 52 communicating with the interior thereof by means of which fluid under pressure enters the cylinder or is exhausted therefrom as will be explained hereinafter.

Positioned below the table 40 I provide a pair of cylinders 53 and 54 each of which has a piston 55 therein and a piston rod 56 extending therefrom. The table 40 includes a pair of suitably apertured depending bosses 57 in which the upper ends of the piston rods 56 are positioned and secured. Thus the table 40 is supported on the piston rods 56 and retained in lateral alignment by the guide members 44 and the guide rails 43.

Adjacent the lower end of the cylinders 53 and 54 a conduit 58 communicates with the interior thereof and adjacent the top a conduit 59 communicates with the interior thereof. Each of the conduits 58 communicates with a common conduit 60 and each of the conduits 59 communicates with a common conduit 61 for the purpose of directing fluid into or out of the cylinders as will be explained hereinafter.

When the mold apparatus opens, the piston 47 through the medium of the piston rod 48 moves the body member 15 onto the table 40 as shown in Fig. 1, and thereafter the pistons 55 through the medium of the piston rods 56 lower the table 40 to a position wherein the upper surface of the body 15 is below the upper surface of the mold base 14 as shown in Fig. 2.

When the mold device closes, the pistons 55 through the medium of the piston rods 56 raise the table 40 to a position wherein the upper surface thereof is flush with the upper surface of the base 14 and thereafter the piston 47 through the medium of the piston rod 48 moves the mold body member 15 inwardly into engagement with the mold body 16.

The mold body member 16 is adapted to form the major portion of the left half of the block 31 and the inner face thereof is shaped as at 62 (see Fig. 9) to form the outer face of the water jacket and at 63 to form the outer faces of the cylinders. The member 16 is also shaped as at 64 (see Fig. 5) to form the outer face of the crank case and as at 65 to form the crank case supporting flange.

At the forward end of the block 31, due to a recess indicated at 66 in Fig. 12, it is impossible for the body member 16 to form the entire half of the block at that end and due to a reverse curvature, indicated at 67 in Fig. 11, it is impossible for the body member 15 to form this portion of the block. This portion of the block, which it is impossible to form with either the mold body 15 or 16, is formed by the angularly movable member 17 which will be more fully described hereinafter. Likewise the mold member 16 does not form the tappet chamber but has a recess 68 therein in which are positioned a lower mold member 69, an upper mold member 70 and an intermediate mold member 71.

The mold body 16 like the mold body 15 is formed hollow and has an inlet conduit 72 and an outlet conduit 73 communicating with the interior thereof for the purpose of circulating temperature controlling oil therethrough.

Extending from the mold base 14 on the same side as the mold body 16 I provide a table portion 74 which is supported on a frame 75. Mounted on the table 74 I provide a cylinder 76 having therein a piston 77 and a piston rod 78 extending therefrom. The piston rod 78 is secured to a pair of protruding bosses 79 on the mold body 16 by a bolt 80.

Adjacent the inner end thereof the cylinder 76 has a conduit 81 (Fig. 1) communicating with the interior thereof and adjacent the outer end has a conduit 82 communicating with the interior thereof by means of which fluid is directed into or is exhausted therefrom as will be explained hereinafter. The body 16 adjacent each end thereof includes a depending rail portion 83 (Fig. 9) which fits within a guide recess 84 in the table 74 and a guide recess 84' in the table 14.

When the mold apparatus opens, the piston 77 through the medium of the piston rod 78 moves the mold body 16 outwardly toward the cylinder 76 a predetermined distance. When the mold device closes the piston 77 through the medium of the piston rod 78 moves the mold body 16 inwardly into engagement with the mold body 15.

The inner end 85 of the lower tappet forming recess mold member 69 is shaped to form the lower portion of the outer surface of the block cylinders and the lower face thereof is recessed as at 86 to form the required number of lower valve guide bosses. (See Figs. 5 and 11.) Furthermore the lower face of the mold member 69 has an elongated recess 87 therein to form a flange at the outer portion of the tappet recess.

The inner end 88 of the upper tappet recess forming mold member 70 is shaped to form the outer surface of that part of the cylinder which is in alignment with the tappet recess. (See Fig. 5.) The upper face of the mold member 70 is recessed as at 89 to form the required number of upper valve guide bosses and has an elongated recess 90 therein to form a depending flange at the outer portion of the tappet recess.

The mold member 71 is positioned between the mold members 69 and 70 and the inner end 92 thereof is shaped similar to the inner ends of the mold members 69 and 70 to form the intermediate portion of the outer surface of the block cylinders.

Positioned below the lower mold member 69 I provide a pair of spaced vertical cylinders 93. (See Figs. 3 and 9.) The cylinders 93 are mounted on an apron 94 integral with and extending outwardly from the mold body 16. Furthermore the cylinders 93 extend through suitable apertures in the apron 94 and are positioned in slots 95 in the table 74. Each of the cylinders 93 has a piston 96 therein and a piston rod 97 extending therefrom.

The mold member 69 includes a pair of suitably apertured depending bosses 98 in which the upper ends of the piston rods 97 are positioned and secured. Thus it will be seen that the mold member 69 is supported on the piston rods 97.

At the lower ends thereof the cylinders 93 each include a conduit 99 communicating with the interior thereof and adjacent the upper ends a conduit 100 communicating with the interior thereof for the purpose of directing fluid into or out of the cylinders as will be explained hereinafter.

Positioned below the lower mold member 69 and at the outside of the cylinders 93 I provide a pair of vertical cylinders 101. (See Figs. 3 and 9.) The cylinders 101 like the cylinders 93 are mounted on the apron 94 extending through suitable apertures therein and positioned in the slots 95 in the table 74. Each of the cylinders 101 has a piston 102 therein and a piston rod 103 extending therefrom.

The mold member 70 includes a pair of suitably apertured depending bosses 104 in which the upper ends of the piston rods 103 are positioned and secured. Thus it will be seen that the mold member 70 is supported on the piston rods 103.

At the lower ends thereof the cylinders 101 each includes a conduit 105 communicating with the interior thereof and adjacent the lower end has a conduit 106 communicating with the interior thereof for the purpose of directing fluid into or out of the cylinders as will be explained hereinafter.

Mounted on and arranged above the table 74 and spaced from the body mold 16 I provide a pair of spaced brackets 107 having opposed slots 108 therein. The slots 108 are of the same height as the mold member 71 and the inner ends of the brackets 107 are close enough to the outer ends of the mold members 69 and 70 so that when the mold member 71 is being moved outwardly the inner end of the mold member 71 will be sufficiently supported until the outer end is sufficiently supported by the brackets 107 to retain it on a level plane.

Mounted on the table 74 beyond the cylinder 76 I provide a cylinder 109 (Fig. 1) having a piston 110 therein and a piston rod 112 extending therefrom. The mold member 71 has a recess 113 in the outer face thereof in which a portion of the piston rod 112 is positioned and is secured to the mold member by a pin 114.

Adjacent the outer end thereof the cylinder 109 has a conduit 115 communicating with the interior thereof and adjacent the inner end a conduit 116 communicating with the interior thereof for the purpose of directing fluid into or out of the cylinder as will be explained hereinafter.

When the mold device opens and before the body mold member 16 moves outwardly the piston 110 through the medium of the piston rod 112 moves the mold member 71 rearwardly into the brackets 107 as shown in Figs. 1 and 6. Immediately thereafter and before the body mold member 16 moves outwardly the pistons 102 through the medium of the piston rods 103 move the upper mold member 70 downwardly. At the same time the pistons 96 through the medium of the piston rods 97 move the lower mold member 69 upwardly a predetermined distance into engagement with the mold member 70 as shown in Fig. 6. Thus the mold members 69 and 70 are in a position to clear the upper and lower valve guide bosses on the block 31 when the mold body 16 moves outwardly.

To form the chamber in the water jacket of the engine block 31 I employ a sand core 117 having core prints 118 which extend above the upper surfaces of the body mold members 15 and 16 and beyond the periphery of block 31 and rest on the upper surfaces of the body mold members 15 and 16 as shown in Figs. 5 and 9.

The upper surfaces of the mold mody members 15 and 16 have a plurality of gas escape recesses 119 therein to relieve the gas pressure when the block is poured.

The angular movable mold member 17 is adapted to form the faces of the recess 66 and the reverse curve 67 at the front end of the block 31. As shown the mold member 17 is formed hollow and includes a portion 120 below the level of the water jacket of the block which projects into a recessed portion 121 of the mold body 16 (see Fig. 12). The portion 120 includes a portion 122 which projects towards the engine block 31 to form the reverse curve portion 67 of the block.

The mold base 14 at one end includes an integral solid extending table portion 123 and at the opposite end a similar table portion 124.

The mold member 17 includes a pair of spaced depending rail members 125 which are positioned in guide slots 126 in the base 14 and the base table 124.

Adjacent one end the mold member 17 has an inlet conduit 127 communicating with the interior thereof and adjacent the opposite end has an outlet conduit 128 communicating with the interior thereof for the purpose of circulating temperature controlling oil through the mold member.

Mounted on a supporting frame 129 extending from one side of the frame 42 I provide a cylinder 130 which has a piston 131 therein and a piston rod 132 extending therefrom. Adjacent the inner end the cylinder 130 has a conduit 133 communicating with the interior thereof and at the opposite end has a conduit 134 communicating with the interior thereof for the purpose of directing fluid into or out of the cylinder as will be explained hereinafter. The piston rod 132 is connected to a pair of protruding bosses 135 by a pin 136.

When the mold device opens the piston 131 through the medium of the piston rod 132 moves the mold member 17 outwardly at approximately the same time as the mold body 15 moves outwardly. When the mold device closes the piston rod 131 through the medium of the piston rod 132 moves the mold member 17 inwardly into engagement with the mold body 16.

As shown in Figs. 14 and 15 the mold body 15 and the mold body 16 are recessed as at 137 to receive the end core member 20. The inner face of the core member 20 includes various recessed portions such as indicated at 138 to form various protruding portions of the rear end of the block 31 and as indicated at 139 to form the outwardly projecting portion of the rear main bearing boss of the block. The core member 20 is formed hollow and has an inlet conduit 140 and an outlet conduit 141 communicating with the interior thereof for the purpose of circulating temperature controlling oil therethrough. Depending therefrom the core member 20 includes a pair of spaced rail members 142 which are positioned in guide grooves 143 in the mold base 14 and the base table 123.

Mounted on the base table 123 I provide a cylinder 144 having a piston 145 therein and a piston rod 146 projecting therefrom which is secured to a pair of spaced projecting bosses 147 on the core member 20 by a pin 148. Adjacent the inner end thereof the cylinder 143 has a conduit 149 communicating with the interior thereof and adjacent the outer end has a conduit 150 communicating with the interior thereof for the purpose of directing fluid into or out of the cylinder as will be explained hereinafter.

When the mold device opens, the piston 145 through the medium of the piston rod 146 moves the core member 20 outwardly a predetermined distance and when the mold device closes the piston 145 through the medium of the piston rod 146 moves the core member 20 inwardly.

As shown in Figs. 12 and 13 the mold body 16 and the mold member 17 are recessed as at 151 to receive the end core member 21. The inner face of the core member 21 has a plurality of protuberances thereon such as indicated at 152 to form various portions of the front end of the engine block 31 and is recessed as at 153 to form the outwardly projecting portion of the front main bearing boss of the block. The core member 21 is formed hollow and has an inlet conduit 154 communicating with the interior thereof and an outlet conduit 155 communicating with the interior thereof for the purpose of circulating temperature controlling oil therethrough. Depending therefrom the core member 21 includes a pair of spaced rail members 156 which are positioned in guide grooves 157 in the mold base 14 and in the base table 124 (see Fig. 13).

Mounted on the base table 124 I provide a cylinder 158 having a piston 159 therein and a piston rod 160 extending therefrom which is secured to a pair of spaced projecting bosses 161 on the core member 21 by a pin 162. Adjacent the inner end thereof the cylinder 158 has a conduit 163 communicating with the interior thereof and adjacent the outer end a conduit 164 communicating with the interior thereof for the purpose of directing fluid into and out of the cylinder as will be explained hereinafter.

When the mold device opens, the piston 159 through the medium of the piston rod 160 moves the core member 21 outwardly a predetermined distance and when the mold device closes the piston 159 through the medium of the piston rod 160 moves the core member 21 inwardly.

At each corner of the frame 13 I provide a vertical cylinder 165 each of which has a piston 166 therein and a piston rod 167 extending therefrom. The upper portions of the piston rods 167 are positioned in guide members 168 mounted on the frame 13 adjacent the top thereof.

Adjacent the lower ends thereof each of the cylinders 165 has a conduit 169 communicating with the interior thereof and adjacent the upper ends each of the cylinders 165 has a conduit 170 communicating with the interior thereof for directing fluid into and out of the cylinders as will be explained hereinafter.

The top member 18 is formed hollow and at each end has a pair of arms 171 extending therefrom. Each of the arms 171 has an aperture 171' therein in which one of the piston rods 167 is positioned and freely slidable therethrough. Mounted on each of the piston rods 167 a predetermined distance below each of the arms 171 I provide a collar 172 which is secured to the piston rods by a pin 172'.

The top member 18 has an inlet conduit 173 and an outlet conduit 174 communicating with the interior thereof for circulating temperature controlling fluid therethrough.

On the same side of the apparatus as the mold body 16 the top member 18 is recessed as at 175 to receive a horizontally movable core member 176. Opening through the top and bottom thereof the top member 18 has a plurality of conduits 177 therein which direct molten metal to the block forming recesses of the device.

The core member 176 includes a hollow body portion 178 and a rearwardly extending table portion 179. The table portion 179 extends beyond the sides of the body portion 178 and is positioned in guide slots 180 formed in the top member 18. The body portion 178 at each side thereof includes protruding rail members 181 on the same plane as the table portion 179 which are positioned in the guide slots 180 (see Fig. 3). The body portion 178 depends below the bottom of the top member 18 and is positioned in the recess 68 in the mold body 16. (See Fig. 9.)

Protruding from the inner face and adjacent the bottom thereof the body 178 includes a plurality of cylindrical exhaust port forming core members 182 which are shown as four in number and a plurality of cylindrical inlet port forming core members 183 which are shown as two in number. The body portion 178 of the core member 176 has an inlet conduit 184 and an outlet conduit 185 communicating with the interior thereof for circulating temperature controlling fluid therethrough.

Mounted on the top member 18 adjacent each side of the recess 175 I provide a cylinder 186 each of which has a piston 187 therein and a piston rod 188 extending therefrom which is secured to an upwardly and outwardly extending arm 189 integral with the table portion 179 of the device 176. Adjacent the inner end thereof each of the cylinders 186 has a conduit 190 communicating with the interior thereof and adjacent the outer end a conduit 191 communicating with the interior thereof for directing fluid into and out of the cylinder as will be explained hereinafter. When the mold device opens the pistons 187 through the medium of the piston rods 188 move the core device 176 outwardly a predetermined distance and thereafter the top member 18 is moved upwardly a predetermined distance by the piston rods 167 as will be more fully explained hereinafter.

The gate and core supporting member 19 includes a pouring gate body portion 192, a core supporting member 193 and a header member 194. The body 192 has a centrally located aperture 195 therein which together with the top member 18 forms a gate chamber into which molten metal is poured which then flows through the gate conduits 177 into the block forming recesses of the apparatus. Surrounding the gate aperture 195 the body 192 is formed hollow and has an inlet conduit 196 and an outlet conduit 197 communicating with the interior thereof for circulating temperature controlling fluid therethrough. Extending outwardly from each end thereof the gate body 192 includes a pair of arms 198 each of which is apertured as at 199 to receive one of the piston rods 167 to which the arms are secured as by a pin 200.

The core supporting member 193 includes a pair of spaced end portions 201 connected by a raised central portion 202 which is of less width than the end portions 201. (See Figs. 1 and 5.) Extending outwardly from each of the end portions 201 the member 193 includes a pair of arms 203 each of which is apertured as at 204 to receive one of the piston rods 167. The member 193 is shown as retained in engagement with the member 192 by collars 205 mounted on the piston rods 167 and secured thereto as by pins 206.

The central portion 202 of the apparatus 193 supports a plurality of depending cylinder forming core members 207 which are shown as four in number. The core members 207 are formed hollow with the lower ends closed and the upper ends open. The central portion of the apparatus 202 further supports a plurality of depending exhaust valve aperture forming core members 208 which are shown as four in number and a plurality of inlet valve aperture forming core members 209 which are shown as four in number. The core members 208 and 209 are formed hollow with the lower ends closed and are open at the top. The lower ends of the core members 208 are shown bevelled as at 208a (see Fig. 5) and are adapted to engage the similarly bevelled ends of the core member 182 of the device 176. The lower ends of the core members 209 include a flattened portion on the sides thereof where they engage the core members 183 of the device 176 (see Fig. 9).

The header member 194 is mounted on the central portion 202 of the member 193 and has two chambers formed therein, a lower chamber 210 and an upper chamber 212. The upper chamber 212 has an inlet conduit 213 opening thereinto and the lower chamber 210 has an outlet conduit 214 opening thereinto for circulating temperature controlling fluid therethrough. In the lower face thereof the header member 194 has a plurality of apertures 215 therein opening into the lower chamber 210. The apertures 215 match the number of cylinder core members 207 and open thereinto. Furthermore in the lower face thereof the header member 194 has a plurality of reduced apertures 216 therein opening into the lower chamber 210. The apertures 216 correspond in number to the number of core members 208 and 209 and open thereinto.

The header member 194 includes a plurality of depending conduits 217 which are positioned in the apertures 215. The upper ends of the conduits 217 open into the upper chamber 212 and the lower ends extend downward to adjacent the lower ends of the core members 207. The temperature controlling fluid is adapted to circulate from the upper chamber 212 down through the conduits 217 into the core members 207, thence upwardly therein and through the apertures 215 into the lower chamber 210.

The header member 194 further includes a plurality of depending conduits 218 which are positioned in the apertures 216. The upper ends of the conduits 218 open into the upper chamber 212 and the lower ends extend downward to adjacent the lower ends of the core members 208 and 209. The temperature controlling fluid is adapted to circulate from the upper chamber 212 down through the conduits 218 into the core members 208 and 209, thence upward therein and through the apertures 216 into the lower chamber 210. The top member 18 includes a plurality of apertures 207' therein in which the core members 207 are positioned and a plurality of apertures 208' in which the core members 208 and 209 are positioned when the mold apparatus is closed. When the mold apparatus opens the piston rods 167 move the gate member 192 and the member 193 upwardly so that the lower ends of the core members 207 are a predetermined distance above the base 14 as shown in Fig. 2.

The crank case core members 24 and 27 are mounted on a base 220. Below the base 220 I provide a pair of cylinders 221 each of which has a piston 222 therein and a piston rod 223 extending therefrom. The upper ends of the piston rods 223 are positioned in suitable apertured bosses 224 depending from the base 220. Adjacent the upper end each of the cylinders 221 has a conduit 226 communicating with the interior thereof and adjacent the lower end a conduit 227 (see Fig. 19) communicating with the interior thereof for directing fluid into and out of the cylinder.

Each of the core members 24 and 27 is formed hollow and has an inlet conduit 228 communicating with the interior thereof adjacent the bottom and has an outlet conduit 229 extending thereinto and upward to adjacent the upper end thereof. Each of the inlet conduits 228 communicates with a common feeder conduit 230 and each of the outlet conduits 229 communicates with a common exhaust conduit 231. The conduits 228 and 229 are provided for the purpose of circulating temperature controlling fluid through the core members 24 and 27. When the mold device opens the pistons 222 through the medium of the piston rods 223 move the core members 24 and 27 downwardly to a position below the core members 23, 25, 26 and 28 as shown in Fig. 8.

For supporting the core members 23, 25, 26 and 28 I provide a vertically movable table member 232 which has a central aperture 233 therein through which the core members 24 and 27 extend. Positioned below the table 232 and outward from the cylinders 221 I provide a pair of cylinders 234 each of which has a piston 235 therein and a piston rod 236 extending therefrom. Adjacent the lower ends thereof each of the cylinders 234 has a conduit 234' (see Fig. 19) communicating with the interior therof and adjacent the upper ends a conduit 234'' communicating with the interior thereof for directing fluid into and out of said cylinders. The upper ends of the piston rods 236 are positioned in suitably apertured bosses 237 integral with and depending from the table 232.

On the upper face thereof the table includes a pair of longitudinally extending dovetail outer track members 238 and a similar pair of inner track members 239. Each of the tracks 238 has a bar member 240 thereon which is recessed to receive the rail 238 and which is connected at one end by a cross bar 241. The tracks 239 like the tracks 238 each have a bar member 242 thereon which is recessed to receive the rail 239 and which is connected at the end opposite the cross bar 241 by a cross bar 243. The inner side bars 242 are of less height than the outer side bars 240.

The core members 25 and 28 have outwardly extending feet portions 244 which are mounted on the bars 240. Likewise the core members 23 and 26 have outwardly extending feet portions 245 which are mounted on the inner bars 242.

For moving the outer bars 240 I provide a cylinder 246 which is mounted on an extension portion 247 of the table 232. The cylinder 246 has a piston 248 therein and a piston rod 249 extending therefrom which is secured as at 250 to a bearing member 251 on the cross bar 241.

For moving the inner bars 242 I provide a cylinder 252 which is mounted on an extension portion 253 of the table 232. The cylinder 252 has a piston 254 therein and a piston rod 255 extending therefrom which is secured as at 256 to a bearing member 257 on the cross bar 243.

A conduit 258 communicates with the interior of the cylinders 246 and 252 adjacent the inner ends thereof and a conduit 259 communicates with the interior of the cylinders 246 and 252 adjacent the outer ends thereof for directing fluid into and out of the cylinders as will be explained hereinafter.

As shown in Fig. 4 the outer end face of the core member 23 is recessed as at 260 to form the inner portion of the front main bearing boss of the block 31. The outer end face of the core member 28 has protuberances thereon such as indicated at 261 to form various portions of the inner face of the rear of the crank case portion of the block 31 and is recessed as at 262 to form the inner portion of the rear main bearing boss.

The adjacent faces of the core members 25 and 26 are recessed as at 263 to form the center main bearing boss of the block 31 and as at 264 to form a web connecting the center bearing boss to the main body of the block. Thus it will be seen that the end core members 23 and 28 must be moved inwardly before they can be moved downwardly and the center core members 25 and 26 must be moved outwardly before they can be moved downwardly.

When the mold apparatus opens and after the core members 24 and 27 have moved downwardly, the piston 248 through the medium of the piston rod 249 moves the bars 240 and the core members 25 and 28 to the left a predetermined distance (see Fig. 8). At the same time the core members 25 and 28 are moved the piston 254 through the medium of the piston rod 255 moves the bars 242 and the core members 23 and 26 to the right into engagement with the core members 25 and 28. Thereafter through the pistons 235 through the medium of the piston rods 236 move the table 232 downward as shown in Fig. 8 to a position wherein the uppermost extremities of the mold members 23, 25, 26 and 28 are below the upper face of the mold base 14.

For guiding the table 232 while it is being vertically moved I provide four vertical guide rails 265 which are mounted on the frame 12. The table 232 adjacent each end includes a protruding lug portion 266 which is recessed as at 267 to receive one of the guide rails 265 (see Fig. 7).

The core members 23, 25, 26 and 28 are formed hollow as shown in Fig. 5 and have an inlet conduit 268 and an outlet conduit 269 opening thereinto through the bottom. The outlet conduit 269 preferably extends upwardly adjacent to the top of the core. The conduits 268 and 269 are provided for the purpose of circulating temperature controlling fluid in the core members.

For automatically directing fluid to the various cylinders in the proper sequence I provide a control device which I have indicated generally at 270 in Fig. 16. This control device may be located at any desired position adjacent the device 10. As shown the control device 270 includes coaxial spaced cylinders 271 and 272 mounted on a suitable base member 273.

The cylinder 271 is closed at its inner end by an integral wall and at the opposite end by a cap member 274 which includes an apertured inlet portion 275. Adjacent the inner end thereof the cylinder 271 includes a depending apertured outlet portion 276. Intermediate the length thereof the cylinder 271 includes upwardly projecting apertured outlet portions 277, 278, 279, 280 and 281.

As shown in Fig. 17 the cylinder 272 is closed at its inner end by an integral wall and at the outer end by a cap member 282 which includes an apertured inlet portion 283. Adjacent the inner end thereof the cylinder 272 includes a depending apertured outlet portion 284. Intermediate the length thereof the cylinder 272 includes upwardly projecting apertured outlet portions 285, 286, 287, 288 and 289.

The cylinder 271 has a piston 290 therein mounted on a piston rod 291 which extends out of the cylinder 271 through a suitable packing gland 292 and into the cylinder 272 through a suitable packing gland 293 wherein it has a piston 294 thereon.

The working face of the piston 290 is directed towards the cap member 274 of the cylinder 271 and the working face of the piston 294 is directed towards the cap member 282 of the cylinder 272. The pistons 290 and 294 are so arranged that when the piston 290 is between the outlet 277 and the inlet 275 as shown in Fig. 16 the piston 294 is positioned between the outlet 285 and the outlet 284 as shown in Fig. 17.

Intermediate the cylinders 271 and 272 the piston rod 291 includes a gear toothed rack portion 295 which is engaged by a pinion gear 296 on a shaft 297 which is suitably journaled in a bracket 298. The shaft 297 also has a worm gear 299 thereon which meshes with a worm pinion 300 on the armature shaft of a reversible motor 301.

For controlling the motor 301 I provide switch members 302 and 303 which are positioned above the piston rod 291 and supported a predetermined distance apart by suitable brackets 304.

In Fig. 18 I have shown a diagram of the electrical circuit for controlling the motor 301. As shown the switch device 302 comprises a relay device including an electro-magnetic coil 305 which is adapted when energized to attract armature arms 306 and 307. The arms 306 and 307 are connected by a bar 308 and the arm 306 is of greater length than the arm 307 and the arm 306 is adapted to be engaged by a pin 309 on the piston rod 291.

The switch 303 comprises a relay device including an electro-magnetic coil 310 which is adapted when energized to attract armature arms 311 and 312. The arms 311 and 312 are connected by a bar 313 and the arm 311 is of greater length than the arm 312 and the arm 311 is adapted to be engaged by the pin 309 on the piston rod 291.

For operating the relay of the switch device 302 I provide a push button switch 314 and for operating the relay of the switch device 303 I provide a push button switch 315. One terminal of the switch 314 is connected to one terminal of the switch 315 by a wire 316 which in turn is connected by a wire 317 to one side of a source of electrical energy which is shown as a battery 318. One terminal of the forward field of the motor 301 is connected to one terminal of the reverse field by a wire 319 which in turn is connected to the wire 317 by a wire 320. One end of the coil 305 is connected to one end of the coil 310 by a wire 321 which in turn is connected by a wire 322 to the other side of the battery 318.

The other terminal of the switch 314 is connected by a wire 323 to the other end of the coil 305. Thus when contact is made between the two terminals of the switch 314 current is directed from the battery 318 through the wires 316, 317 and 323 to the coil 305 and from the coil back to the battery through the wires 321 and 322 thereby energizing the coil 305.

The other terminal of the switch 315 is connected by a wire 324 to the other end of the coil 310. Thus when contact is made between the two terminals of the switch 315 current is directed from the battery 318 through the wires 316, 317 and 324 to the coil 310 and from the coil 310 back to the battery through the wires 321 and 322 thereby energizing the coil 310.

The arm 312 of the switch device 303 is adapted to engage a contact 325 which is connected by a wire 326 to the wire 317 and the arm 312 is connected by a wire 326 to the wire 317 and the arm 312 is connected by a wire 327 to the wire 324. The wire 326 has a switch 326' interposed therein for a purpose which will be explained hereinafter.

The arm 311 is adapted to engage a contact 328 which is connected by a wire 329 to the other terminal of the forward field of the motor 301. The arm 311 is connected by a wire 330 to the wire 322. Thus when the coil 310 is energized as previously explained and attracts the arms 311 and 312 the arm 311 engages the contact 328 thereby establishing a circuit from the battery 318 through the wires 322, 330 and 329 to the motor 310 and from the motor through wires 319 and 320 back to the battery whereupon the motor operates and through the medium of its associated gear train moves the piston rod 291 towards the cylinder 272. At the same time the arm 311 engages the contact 328 the arm 312 engages the contact 325 thereby establishing a circuit through the wires 317, 326, 327 and 324 to the coil 310 which circuit retains the coil 310 energized after the circuit is broken through the release of push button 315.

Thus the motor continues to operate to move the piston towards the cylinder 272 until the pin 309 on the piston rod 291 engages the arm 311 and moves it out of engagement with the contact 328 and the arm 312 out of engagement with the contact 325 thereby breaking the circuits to the motor 301 and the coil 310 whereupon the motor 301 ceases to operate and the piston rod ceases to move towards the cylinder 272.

The operation of the electrical controls and the action of the control device 270 just described is that which occurs when the mold device is operated to an open position. The following description is that which occurs when the mold device is operated to a closed position. The arm 307 of the switch device 302 is adapted to engage a contact 331 which is connected by a wire 332 to the wire 326 and the arm 307 is connected by a wire 333 to the wire 323.

The arm 306 is adapted to engage a contact 334 which is connected by a wire 335 to the other terminal of the reverse field of the motor 301. The arm 306 is connected by a wire 336 to the wire 322. Thus when the coil 305 is energized as previously described and attracts the arms 306 and 307 the arm 306 engages the contact 334 thereby establishing a circuit from the battery 318 through the wires 322, 336 and 335 to the motor 301 and through the wires 319 and 320 back to the battery whereupon the motor operates and through the medium of its associated gear train moves the piston rod 291 towards the cylinder 271.

At the same time the arm 306 engages the contact 334 the arm 307 engages the contact 331 thereby establishing a circuit through the wires 317, 326, 332, 333 and 323 to the coil 305 which circuit retains the coil 305 energized after the circuit is broken through the release of the push button 314. Thus the motor 301 continues to operate to move the piston rod 291 towards the cylinder 271 until the pin 309 on the piston rod engages the arm 306 and moves it out of engagement with the contact 334 and the arm 307 out of engagement with the contact 331 thereby breaking the circuit to the motor and the coil 305 whereupon the motor ceases to operate and the piston rod 291 ceases to move towards the cylinder 271.

In Fig. 19 I have shown in diagram the connections between the control device 270 and the various operating cylinders of the mold device 10. As shown the inlet 275 of the cylinder 271 is connected by a conduit 340 with a constant pressure fluid supply reservoir 341. The inlet 283 of the cylinder 272 is connected by a conduit 342 to the conduit 340 and the outlet 284 is connected by a conduit 343 to an exhaust pressure reservoir 344. The outlet 276 of the cylinder 271 is connected by a conduit 345 to the conduit 343. The reservoir 344 is connected by a conduit 346 to the intake side of a fluid pump 347 and the outlet side of the pump is connected by a conduit 348 to the pressure reservoir 341.

The outlet 277 of the control cylinder 271 is connected by a conduit 350 to the inner conduit 116 of the operating cylinder 109 the upper conduit 115 of which is connected by a conduit 351 to the outlet 285 of the control cylinder 272. A conduit 352 connects the conduit 350 with the upper conduits 226 of the operating cylinders 221 and the lower conduits 227 are connected by a conduit 353 to the conduit 351. The inner conduit 149 of the operating cylinder 144 is connected to the conduit 352 by a conduit 354 and the outer conduit 150 is connected by a conduit 355 to the conduit 353.

The inner conduit 163 of the operating cylinder 158 is connected by a conduit 356 to the conduit 352 and the outer conduit 164 is connected by a conduit 357 to the conduit 353. The lower conduits 190 of the operating cylinders 186 are connected by a conduit 358 to the conduit 350 and the upper conduits 191 are connected by a conduit 359 to the conduit 351.

The lower conduits 169 of the front pair of operating cylinders 165 are connected by a conduit 360 and the lower conduits 169 of the rear pair of operating cylinders 165 are connected by a conduit 361. The conduit 360 is connected by a conduit 362 to a conduit 363 which in turn is connected to the outlet 278 of the control cylinder 271. The conduit 361 is connected by a conduit 364 to the conduit 363. The upper conduits 170 of the front pair of operating cylinders 165 are connected by a conduit 365 and the upper conduits 170 of the rear pair of operating cylinders 165 are connected by a conduit 366. The conduit 365 is connected by a conduit 367 to a conduit 368 which in turn is connected to the outlet 286 of the control cylinder 272. The conduit 366 is connected by a conduit 369 to the conduit 368.

The conduit 258 which connects the inner ends of the cylinders 246 and 252 is connected by a conduit 370 to the conduit 363 and the conduit 259 which connects the outer ends of the cylinders 246 and 252 is connected by a conduit 371 to the conduit 368.

The lower conduits 99 of the operating cylinders 98 are connected by a conduit 372 and the upper conduits 100 are connected by a conduit 373.

The lower conduits 105 of the operating cylinders 101 are connected by a conduit 374 and the upper conduits 106 are connected by a conduit 375. The lower connecting conduits 372 of the cylinders 93 are connected by a conduit 376 to the upper connecting conduit 375 of the cylinders 101 and the upper connecting conduit 373 of the cylinders 93 is connected by a conduit 377 to the lower connecting circuit 374 of the cylinders 101. The conduit 375 is connected by a conduit 378 to the conduit 370 and the conduit 374 is connected by a conduit 379 to the conduit 371.

The lower conduits 234' of the cylinders 234 are connected by a conduit 380 and the upper conduits 234'' are connected by a conduit 381. The upper connecting conduit 381 of the cylinders 234 is connected by a conduit 382 to the outlet 279 of the control cylinder 271 and the lower connecting conduit 380 is connected by a conduit 383 to the outlet 287 of the control cylinder 272.

The inner conduit 51 of the operating cylinder 46 is connected by a conduit 384 to the outlet 280 of the control cylinder 271 and the outer conduit 52 is connected by a conduit 385 to the outlet 288 of the control cylinder 272.

The inner conduit 133 of the control cylinder 130 is connected by a conduit 386 to the conduit 384 and the outer conduit 134 is connected by a conduit 387 to the conduit 385.

The inner conduit 81 of the operating cylinder 76 is connected by a conduit 388 to the conduit 384 and the outer conduit 82 is connected by a conduit 389 to the conduit 385.

The upper connecting conduit 59 of the operating cylinders 53 and 54 is connected by a conduit 390 to the outlet 281 of the control cylinder 271 and the lower connecting conduit 58 of the cylinders 53 is connected by a conduit 391 to the outlet 289 of the control cylinder 272.

The control device 270, the reservoirs 341 and 344 and the pump 347 are preferably located in a suitable position above the uppermost conduit connection to the operating cylinders so that the conduits will not drain when there is no pressure in the conduits.

The control push buttons 314 and 315 may be located at any position convenient to the operator of the mold apparatus 10.

To open the mold apparatus 10 the operator presses the push button 315 thereby causing the motor 301 to operate and move the piston rod 291 towards the control cylinder 272 as previously described. As the piston 290 is moved by the piston rod 291 toward the cylinder 272 it successively passes the outlets 277, 278, 279, 280 and 281 of the cylinder 271. As the piston 290 passes the outlet 277 pressure is transmitted from the inlet conduit 340 into and through the conduit 350 into the inner end of the cylinder 109 thereby forcing the piston 110 outwardly which through the medium of the piston rod 112 moves the core member 71 outwardly as previously described and shown in Fig. 1 and Fig. 6.

At the same time pressure is transmitted from the conduit 352 into the upper ends of the cylinders 221 thereby forcing the pistons 222 downwardly which through the medium of the piston rods 223 move the crank case core members 24 and 27 downwardly as previously described and shown in Fig. 8. Furthermore at the same time pressure is transmitted from the conduit 352 into the conduits 354 and 356 thereby forcing the piston 145 of the cylinder 143 and the piston 159 of the cylinder 158 outwardly. As the piston 145 is thus moved it moves, through the medium of the piston rod 146, the end core member 20 outwardly as previously described and shown in Figs. 2 and 3.

As the piston 159 is forced outwardly it moves, through the medium of the piston rod 160, the end core member 21 outwardly as previously described and shown in Figs. 2 and 3. Still further at the same time pressure is transmitted from the conduit 350 through the conduit 358 into the inner ends of the cylinders 186 thereby forcing the pistons 187 outwardly which move, through the medium of the piston rods 188, the core member 176 outwardly as previously described and shown in Figs. 1 and 6.

As the piston 290 and the piston rod 291 move toward the control cylinder 272 the piston 294 therein moves towards the inlet 283 thereof. As the piston 294 thus moves it first successively restricts pressure from the inlet conduit 342 to the outlet conduits 285, 286, 287, 288 and 289 and then allows the pressure in the conduits associated with the outlets 285, 286, 287, 288 and 289 to be transmitted through the cylinder 272 into the outlet conduit 284.

The exhaust fluid under pressure from the outer end of the cylinder 109 is transmitted through the conduit 351 to the outlet 285 of the control cylinder 272. The exhaust fluid under pressure from the outer ends of the cylinders 186 is transmitted through the conduit 359 into the conduit 351 and the exhaust fluid under pressure from the lower ends of the cylinders 221 is transmitted through the conduits 353 into the conduit 351. The exhaust fluid under pressure from the outer end of the cylinder 144 is transmitted through the conduit 355 into the conduit 353 and the exhaust fluid under pressure from the outer end of the cylinder 158 is transmitted through the conduit 357 into the conduit 353.

When the piston 290 of the control cylinder 271 passes the outlet 278 fluid under pressure is transmitted from the inlet conduit 340 through the cylinder 271 into the conduit 363. From the conduit 363 fluid under pressure is transmitted through the conduits 362, 364, 360 and 361 into the lower ends of the four cylinders 165 thereby forcing the pistons 166 and associated piston rods 167 upwardly. As the piston rods 167 move upwardly they move the gate and core supporting member 19 unwardly as shown in Fig. 2. After the member 19 has moved upwardly a predetermined distance the collars 172 on the piston rods 167 engage the top member 18 and move it upwardly a predetermined distance as shown in Fig. 2. Fluid under pressure is also transmitted from the conduit 363 through the conduit 370 and the conduit 258 into the inner ends of the cylinders 246 and 252 forcing the piston 248 of the cylinder 246 and the piston 254 of the cylinder 252 outwardly. As the piston 248 is thus moved it, through the medium of the piston rod 249 and the bearing member 251, moves the crank case core members 25 and 28 as previously described to the positions shown in Fig. 8.

As the piston 254 moves outwardly it, through the medium of the piston rod 255 and the bearing member 257, moves the crank case core members 23 and 26 as previously described to the positions shown in Fig. 8.

At the same time fluid under pressure is transmitted from the conduit 370 through the conduit 378 into the conduit 372 into the lower ends of the cylinders 93 and into the conduit 375 and into the upper ends of the cylinders 101, thus forcing the pistons 96 of the cylinders 93 upwardly and the pistons 102 of the cylinders 101 downwardly.

As the pistons 93 move upwardly they, through the medium of the piston rods 96, move the core member 69 upwardly a predetermined distance as previously described and as shown in Fig. 6. As the pistons 102 move downwardly they, through the medium of the piston rods 103, move the core member 70 downwardly a predetermined distance as previously described and shown in Fig. 6.

The exhaust fluid under pressure from the upper ends of the four cylinders 165 is transmitted through conduits 365, 366, 367 and 369 into the conduit 368. The exhaust fluid under pressure from the outer ends of the cylinders 246 and 252 is transmitted through the conduits 259 and 371 into the conduit 368. The exhaust fluid under pressure from the upper ends of the cylinders 93 is transmitted through the conduits 373, 377 and 379 to the conduit 371. The exhaust fluid under pressure from the lower ends of the cylinders 101 is transmitted through the conduit 374 to the conduit 379.

When the piston 290 in the control cylinder 271 passes the outlet 280 fluid under pressure is transmitted from the inlet conduit 340 through the cylinder 271 into the conduit 388 and thence into the inner end of the cylinder 76 thereby forcing the piston 77 outwardly. As the piston 77 is thus moved it, through the medium of the piston rod 78, moves the mold body member 16 outwardly as previously described and shown in Fig. 6.

At the same time fluid under pressure is transmitted from the conduit 388 through the conduit 384 into the inner end of the cylinder 46 thereby forcing the piston 47 outwardly which, through the medium of the piston rod 48, moves the mold body member 15 outwardly onto the table member 40 as previously described and shown in Figs. 1 and 6.

At the same time fluid under pressure is transmitted from the conduit 384 through the conduit 386 into the inner end of the cylinder 130 thereby moving the piston rod 131 outwardly which through the medium of the piston rod 132 moves the angularly movable mold member 17 outwardly, as previously described and shown in Figs. 1 and 2.

The exhaust fluid under pressure from the outer end of the cylinder 76 is transmitted through the conduit 389 to the outlet 288 of the control cylinder 272. The exhaust fluid under pressure from the outer end of the cylinder 46 is transmitted through the conduit 385 to the conduit 389 and the exhaust fluid under pressure from the outer end of the cylinder 130 is transmitted through the conduit 387 to the conduit 385.

When the piston 290 passes the outlet 281 fluid under pressure is transmitted from the inlet conduit 340 through the cylinder 271 and into and through the conduit 390 through the conduit 59 into the upper ends of the cylinders 53 and 54 thereby forcing the pistons 55 downwardly. As the pistons 55 move downwardly they, through the medium of the piston rods 56, move the table member 40 downwardly as previously described and shown in Fig. 2.

The exhaust fluid under pressure from the lower ends of the cylinders 53 and 54 is transmitted through the conduit 58 and the conduit 391 to the outlet 289 of the control cylinder 272.

After the table is lowered the cast engine block 31 may be removed from the mold device by any desirable means.

To close the mold device the operator presses the push button 14 thereby causing the motor 301 to operate and move the piston rod 291 towards the cylinder 271 as previously described. As the piston 294 is moved towards the cylinder 271 it successively passes the outlets 289, 288, 287, 286 and 285. As the piston 294 passes the outlet 289 pressure is transmitted from the inlet 342 through the cylinder 272 into and through the conduit 391 and through the conduit 58 into the lower ends of the cylinders 53 and 54 thereby forcing the pistons 55 upwardly. As the pistons 55 move upwardly they, through the medium of the piston rods 56, move the table member 40 upwardly as previously described. The exhaust pressure from the upper ends of the cylinders 53 and 54 is transmitted through the conduits 59 and 390 to the outlet 281 of the control cylinder 271.

As the piston 294 passes the outlet 288 pressure is transmitted from the inlet conduit 342 into and through the conduit 389 into the outer end of the cylinder 76 forcing the piston 77 inward which through the medium of the piston rod 78 moves the mold body member 16 inwardly as previously described to the position shown in Fig. 5. At the same time pressure is transmitted through the conduit 385 into the outer end of the cylinder 46 thereby forcing the piston 47 inwardly which, through the medium of the piston rod 48, moves the mold body member 15 inwardly as previously described to the position shown in Fig. 5. Furthermore at the same time pressure is transmitted from the conduit 385 into and through the conduit 387 into the outer end of the cylinder 130 thereby forcing the piston 131 inwardly which, through the medium of the piston rod 132, moves the angularly movable mold member 17 inwardly as previously described to the position shown in Fig. 9.

The exhaust fluid under pressure from the inner end of the cylinder 76 is transmitted through the conduit 388 to the outlet 280 of the control cylinder 271. The exhaust fluid under pressure from the inner end of the cylinder 46 is transmitted through the conduit 384 to the conduit 388 and the exhaust fluid under pressure from the cylinder 130 is transmitted through the conduit 386 to the conduit 384.

After the mold bodies 15 and 16 have been moved to their closed position the operator stops the motor 301 by opening the switch 326'. The water jacket core 117 is then placed in position and thereafter the operator closes the switch 326' and presses the push button 314 to again start the motor 301 to move the piston rod 291 towards the cylinder 271.

When the piston 294 in the control cylinder 272 passes the outlet 287 fluid under pressure is transmitted from the conduit 342 into and through the cylinder 272 and into the conduit 383 from which it is transmitted through the conduit 380 into the lower ends of the cylinders 234 thereby forcing the pistons 235 upwardly. As the pistons 235 move upwardly they, through the medium of the piston rods 236, move the table 232 and the crank case core members 23, 25, 26 and 28 thereon upwardly as previously described to the position shown in Fig. 4.

The exhaust fluid under pressure from the upper ends of the cylinders 234 is transmitted through the conduit 381 into and through the conduit 382 to the outlet 279 of the control cylinder 271.

When the piston 294 passes the outlet 286 fluid under pressure is transmitted from the inlet conduit 342 into and through the cylinder 272 and into the conduit 368 and thence through the conduits 365, 366, 367 and 369 into the upper ends of the four cylinders 165 forcing the pistons 166 and piston rods 167 downwardly. As the piston rods 167 move downwardly they first deposit the top member 18 in position on top of the mold body members 15 and 16 and then continue downwardly until the gate and core supporting member 19 is in position on top of the top member 18 as shown in Figs. 4 and 5.

At the same time fluid under pressure is transmitted from the conduit 368 through the conduit 371 and the conduit 259 into the outer ends of the cylinders 246 and 252 thereby forcing the piston 248 in the cylinder 246 and the piston 254 in the cylinder 252 inwardly. As the piston 248 moves the bearing member 251 and the crank case core members 25 and 28 toward the piston 252 as previously described to the position shown in Fig. 4. As the piston 254 moves inwardly it, through the medium of the piston rod 255, moves the bars 242 and the crank case core members 23 and 26 towards the piston 246 as previously described to the position shown in Fig. 4.

Furthermore at the same time fluid under pressure is transmitted through the conduit 379 and thence through the conduit 377 and the conduit 373 into the upper ends of the cylinders 93 thereby forcing the pistons 96 therein downwardly. At the same time fluid under pressure is transmitted through the conduits 374 into the lower ends of the cylinders 101 thereby forcing the pistons 102 upwardly. As the pistons 96 move downwardly they, through the medium of the piston rods 97, move the core member 69 downwardly as previously described to the position shown in Fig. 5. As the pistons 102 move upwardly they through the medium of the piston rods 103 move the core member 70 upwardly as previously described to the position shown in Fig. 5.

The exhaust fluid under pressure from the lower ends of the four cylinders 165 is transmitted through the conduits 360, 361, 362 and 364 into and through the conduits 363 to the outlet 278 of the control cylinder 271.

The exhaust pressure from the inner end of the cylinder 246 and the cylinder 252 is transmitted through the conduits 258 and 370 to the conduit 363. The exhaust fluid under pressure from the lower ends of the cylinders 93 is transmitted through the conduits 372, 376 and 378 to the conduit 370 and the exhaust fluid under pressure from the upper ends of the cylinders 101 is transmitted through the conduits 375 to the conduit 378.

When the piston 294 passes the outlet 285 fluid under pressure is transmitted from the inlet conduit 342 into and through the cylinder 272 and into the conduit 351 into the outer end of the cylinder 109 thereby forcing the piston 110 inwardly. As the piston 110 moves inwardly it, through the medium of the piston rod 112, moves the core member 71 into position between the core members 69 and 70 as previously described and shown in Fig. 5. At the same time fluid under pressure is transmitted from the conduit 351 through the conduits 359 and 191 into the outer end of the cylinders 186 thereby forcing the pistons 187 inwardly which, through the medium of the piston rods 188, move the core member 176 inwardly as previously described to the position shown in Fig. 5.

Furthermore at the same time fluid under pressure is transmitted from the conduit 351 through the conduits 353 and 227 into the lower ends of the cylinders 221 thereby forcing the pistons 222 upwardly. As the pistons 222 move upwardly they, through the medium of the piston rods 223, move the table 220 and the crank case core members 24 and 27 thereon upwardly as previously described to the positions shown in Fig. 4.

Still further at the same time fluid under pressure is transmitted from the conduit 353 through the conduit 357 and 355 to the outer ends of the cylinders 144 and 158 thereby forcing the piston 145 of the cylinder 144 inwardly and the piston 159 of the cylinder 158 inwardly. As the piston 145 moves inwardly it, through the medium of the piston rod 146, moves the end core member 20 inwardly as previously described to the position shown in Fig. 4. As the piston 159 moves inwardly it, through the medium of the piston rod 160, moves the end core member 21 inwardly as previously described to the position shown in Fig. 4.

The exhaust fluid under pressure from the inner end of the cylinder 109 is transmitted through the conduit 350 to the outlet 277 of the control cylinder 271. The exhaust fluid under pressure from the inner ends of the cylinders 186 is transmitted through the conduits 190 and 358 to the conduit 350 and the exhaust fluid under pressure from the upper ends of the cylinders 221 is transmitted through conduits 226 and 352 to the conduit 350. The exhaust fluid under pressure from the inner ends of the cylinders 144 and 158 is transmitted through the conduits 354 and 356 to the conduit 352.

The mold device 10 is now completely closed and is ready to receive molten metal which is poured into the aperture 195 of the gate member 192 and flows downwardly through the apertures 117 in the top member into the recessed portions of the mold body members 15 and 16 to form an engine block.

From the foregoing description it will be apparent that I have provided a novel mechanical mold device for casting engine blocks.

Having thus described my invention I claim:

1. In a permanent mold apparatus, a base, a table mounted adjacent said base, means to move said table from a lowered position below the base to a location level with the base, a mold slidably mounted on said table, means on the table to move the mold to and from molding position, a second mold member, means to mount the second mold member on the base for movement towards and from molding position, said first and second mold members having parallel movement and said table having a movement in a plane at right angles to the plane of movement of the mold members when they are moving towards and from each other and a third mold member slidable on the base, said third mold member being movable towards and from said first and second mold members.

2. In a mold device for forming engine blocks, a base member, a pair of opposed mold body members, said body members being recessed to each form the outer surface of one half of an engine block, means to move said body members towards and from each other, a top mold member engaging the upper portions of said body mold members, means to raise and lower said top member, means to mount the gate member for movement towards and from the top member, the gate member in one position, a gate member engaging the upper portion of said top mold member, said gate member being apertured to receive molten metal, and means in said top member to direct molten metal into said engine block forming recesses of said body mold members, and means to raise and lower said gate member.

3. In a mold device for casting engine blocks, a base member, a pair of opposed mold body members on said base member, said body members being recessed to each form the outer surface of one half of an engine block, a top member engaging the upper surfaces of said body members, a gate member engaging the upper surface of said top member, means to mount the gate member for vertical movement towards and from the top member, said gate member being apertured to receive molten metal, means in said top member to direct molten metal from said gate aperture into said engine block forming recesses of said body members, means to horizontally move both of said body members towards and from each other, means to vertically move one of said body members, means to vertically move said top member and means to vertically move said gate member.

4. In a permanent mold device for casting an engine block which has therein a plurality of cylinder apertures, a hollow open bottomed crank case, a valve tappet recess in one side thereof, a plurality of inlet and exhaust valve apertures opening through the upper face thereof and a plurality of inlet and exhaust port apertures opening through the side thereof comprising a base, mold means movable on the base for forming the outer surface of said engine block, core means movable on the base for forming said cylinder apertures, core means movable on the base for forming said crank case recess, movable core means for forming said tappet recess, movable core means for forming said inlet and exhaust valve apertures, movable core means for forming said inlet and exhaust valve port apertures, and means to move said mold means and all of said core means towards and from molding position.

5. In a mold device for forming engine blocks, a base member, a pair of opposed body mold members, said body mold members being recessed to each form the outer surface of one half of an engine block, means to move said body mold members towards and from each other, a top member, means to mount said top member for movement towards and from the body mold members, said top member in one position engaging the upper surfaces of said body mold members, means to vertically move said top member, one of said body mold members having an aperture therein opening through the outer face and the upper surface thereof, a core member mounted to reciprocate in said aperture, means to move said core member relative to said top member, said core member on the inner face thereof including a plurality of spaced horizontally protruding cores, said cores being adapted to form the inlet and exhaust ports in said engine block.

6. In a mold device for forming engine blocks, a base member, a pair of opposed body mold members, said body mold members being recessed to each form the outer surface of one half of an engine block, means to move said body mold members towards and from each other, one of said body mold members having an aperture therein opening through one side thereof, a plurality of core members positioned in said aperture and movable on said one body member, said core members being adapted to form the valve tappet recess of an engine block, said plurality of core members including a lower core member, an upper core member and a spacer core member positioned between said lower and upper core members, means to horizontally move said spacer core member in the same direction as said body mold member, means to vertically move said lower and said upper core members, said lower and upper core members being movable with said one body mold member.

7. In a mold device for forming engine blocks, a base member, a pair of opposed mold body members, said body members being recessed to each form one half of an engine block, means to move said body members, a top member engaging said body members, means to elevate said top member, a gate member movable towards and from said top member and in one position engaging the upper face of said top member, said gate member being apertured to receive molten metal, means to elevate said gate member, a core supporting member above said gate member, a plurality of core members depending from said core supporting member, said core members being adapted to form the cylinder apertures of said engine block, said gate member being apertured to receive said cylinder core members.

8. In a mold device for casting engine blocks, a base member, a pair of opposed mold body members, said body members being recessed to each form the outer surface of one half of an engine block, means to move said body members towards and from each other, a top member engaging the upper surfaces of said body members, means to vertically move said top member, a core supporting member above said top member, a plurality of core members depending from said core supporting member, said core members being adapted to form the cylinder apertures of said engine block, means to vertically move said core supporting member, said top member having apertures therein in which said depending core members are positioned, said base member having an aperture therein opening into said recessed portions of said mold body members, a plurality of core members positioned in said base aperture and being spaced from the inner surface of said body members to form the inner surface of the crank case of said engine block, and means to vertically move said crank case core members.

9. In a mold device for forming engine blocks, a base member, a pair of opposed mold body members, said body members being recessed to each form the outer surface of one half of an engine block, means to move said body mold members towards and from each other, a top mold member engaging the upper portions of said body mold members, means to raise and lower said top mold member, a gate member engaging the upper portion of said top mold member, said gate member being apertured to receive molten metal, means in said top mold member to direct molten metal into said engine block forming recesses of said body mold members, means to raise and lower said gate member, a core supporting member above said gate member, a plurality of core members depending from said core supporting member, said core members being adapted to form the cylinder apertures of said engine block, said gate member being apertured to receive said cylinder core members, a plurality of other core members depending from said core supporting member, said other core members being adapted to form the inlet and exhaust valve seat apertures of said engine block, said gate member being apertured to receive said other core members, and means to raise and lower said core supporting member.

10. In a mold device for forming engine blocks, a base member, a pair of opposed mold body members on said base member, said body members being recessed to each form the outer surface of one half of an engine block, means to move said body members, a top member engaging the upper surfaces of said body members, means to vertically move said top member, a gate member engaging the upper face of said top member, one of said mold body members having an aperture therein opening through the top and outer face thereof, a plurality of core members positioned in said body aperture adjacent the bottom thereof, said core members being adapted to form the valve tappet recess of said engine block, said core members including a lower core member, an upper core member and a spacer core member, means to horizontally move said spacer core member in the same direction as said body member, means to vertically move said lower and said upper core members and said lower and said upper core members being movable with said apertured body member, a core member positioned in said body aperture above said tappet recess forming core members, means to movably support said last mentioned core member on said top member, and means to horizontally move said core member.

MATTHEW WAGNER.